J. N. GOODALL.
PIPE COUPLING.
APPLICATION FILED SEPT. 4, 1908.
969,358.
Patented Sept. 6, 1910.
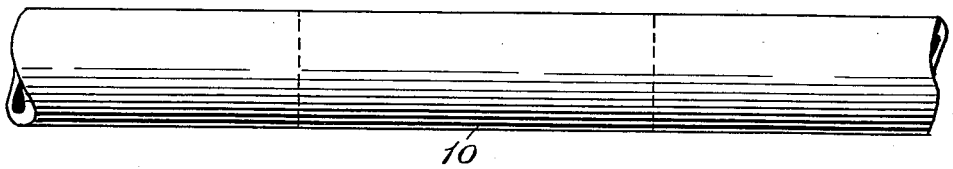
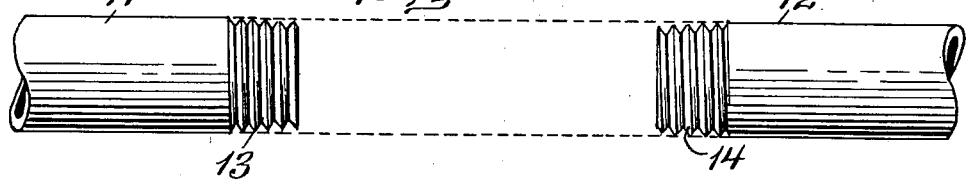
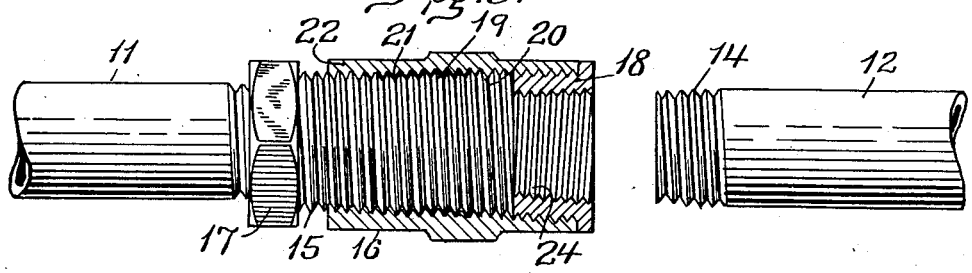
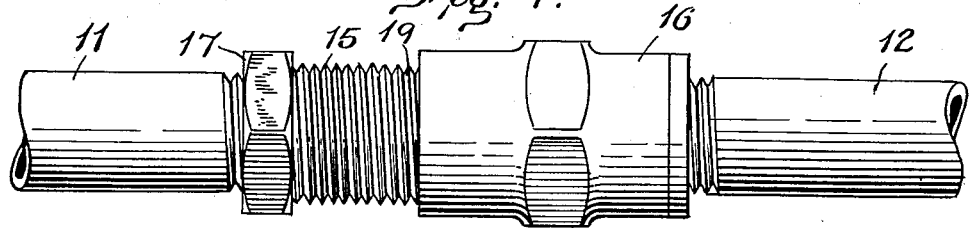
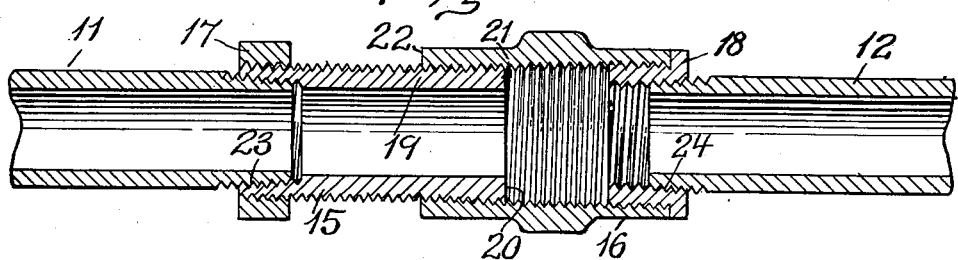
Witnesses:
Inventor
John N. Goodall
by Wright, Brown, Quinby & Way
Attorneys

UNITED STATES PATENT OFFICE.

JOHN N. GOODALL, OF PORTSMOUTH, NEW HAMPSHIRE, ASSIGNOR, BY MESNE ASSIGNMENTS, TO GOODALL MANUFACTURING COMPANY, A CORPORATION OF MAINE.

PIPE-COUPLING.

969,358.   Specification of Letters Patent.   Patented Sept. 6, 1910.

Application filed September 4, 1908. Serial No. 451,691.

*To all whom it may concern:*

Be it known that I, JOHN N. GOODALL, of Portsmouth, in the county of Rockingham and State of New Hampshire, have invented certain new and useful Improvements in Pipe-Couplings, of which the following is a specification.

This invention relates to improved long thread coupling devices for pipes which are intended to either conduct gas, air or steam, or to exclude water or other moisture. In the former instance, it is adapted for use in installing or repairing water and other pipes, such as those employed for distributing water, gas, steam &c. in buildings. In the latter instance, it is also adapted for use in connection with conduits employed for inclosing electric conductors. In both instances, its application is the same, and it is employed to join two sections of pipe in alinement, without necessitating extra coupling members such as unions, thimbles, etc. In this connection, reference may be had to U. S. Letters Patent No. 786,558, granted to me April 4, 1905, in which one of the sections of pipe to be joined requires an interiorly threaded coupling to be fitted thereto before it can receive the coupling.

Referring to the drawings forming a part of this specification,—Figure 1 represents an elevation of a continuous pipe or conduit. Fig. 2 represents adjacent ends of two sections of pipe, provided with external taper screw-threads. Fig. 3 represents the same, with a coupling device partly in section attached to one pipe section. Fig. 4 represents an elevation of the two pipe sections joined by the coupling device. Fig. 5 represents a longitudinal section of the latter.

The same reference characters indicate the same parts wherever they occur.

Fig. 1 shows a continuous pipe or conduit 10, which may be severed on the dotted lines and the central piece thereof removed, if access to the interior of the pipe is desired, or if an electric conductor contained therein requires repairs. In any event, the coupling device hereinafter described is, adapted to bridge a gap between two sections of pipe 11 and 12, as shown by Fig. 2, and to join the adjacent ends so that they may be made water tight without other means such as solder or red lead.

The ends of the pipe sections 11 and 12 are supplied with exterior taper-threads 13 and 14 of the same gage. The coupling device therefor comprises two members 15 and 16 which are connected by screw-threads and which are adapted to engage the screw-threads 13 and 14 respectively. For convenience in manufacturing, the two members 15 and 16 may be made as shown in Fig. 5, one with an external wrench fitting 17 which may be shrunk or otherwise affixed thereon, and the other with an interior bushing 18 likewise permanently affixed. The external screw-thread of the member 15 is of uniform diameter between the collar 17 and the point 19, but of increasing diameter from the point 19 to the end 20. The internal thread of the member 16 is also of uniform diameter between the bushing 18 and the point 21, but of decreasing diameter from the point 21 to the end 22. By reason of thus forming the coöperative screw-threads, they are necessarily engaged with each other at all times, whether they are longitudinally contracted as in Fig. 3, or extended as in Figs. 4 and 5. In the former instance, however, they are adapted to turn freely, but, when the two tapering portions are brought together as shown in Fig. 5, they bind so as to produce a water-tight joint. The opposite end of the member 15 and the bushing 18 are formed with similar internal tapering threads 23 and 24, which are adapted to engage the threads 13 and 14 of the pipes to be coupled. All of the screw-threads are preferably inclined in the same direction.

In applying the coupling, the two parts 15 and 16 are contracted, as shown in Fig. 3, when one member thereof is screwed upon one of the pipe sections. This joint having been made tight, the other member, preferably the outer member 16, is turned so as to move it into engagement with the other pipe section. If the space between the two sections is determined with approximate accuracy, the bushing 18, when screwed upon the thread 14, tightens to the same degree as the coöperative taper threads of the members 15 and 16, thus tightening the three screw-joints with but two operations.

The fitting 17 and bushing 18 are shown and described as shrunk or otherwise affixed to their respective members because of a convenience in manufacturing the device in that manner instead of making them integral with said members. At any rate, as it is obvious that when the members 15 and 16, having the parts 17 and 18 rigid therewith are once assembled, they can not be separated, owing to the taper of their interengaging threads from the point 19 to the end 20 of member 15. They are therefore inseparably connected but they are, of course, collapsible to a length to enable them to be inserted bodily, by a lateral movement, into the space between the ends of the two pipe sections 11 and 12, so that the piping need not be shifted from the position occupied before the pipe 10 was cut to form said two sections. Obviously, if either pipe section could be shifted longitudinally, any ordinary coupling could be employed to connect them. To collapse the coupling to a length so that it can be slipped into the space between the ends of pipe sections 11, 12, it is only necessary to rotate one relatively to the other until the end 20 of member 15 abuts the inner end of bushing 18. Then the members can be rotated to engage them with the threaded portions of the pipe sections as shown in Fig. 5. To remove the coupling without disturbing the position of either pipe section, it is only necessary to collapse the coupling to its minimum length, and remove it bodily, by a lateral movement, the member 15 being then almost entirely contained within the member 16.

As will be readily understood, it is of course desirable that there shall be no material difficulty in the operation of effecting the complete joining; that after one member, as member 15, has been screwed upon the pipe section 11, the other member 16 will stand in alinement with pipe section 12 so as to insure the proper catching of the thread of section 12 and thus avoid spoiling the threads by crossing them. All threads are one way; that is, all are right-hand threads in the drawing although, as is obvious, all might be left-hand threads.

All threads being cut in the same direction, the operation of the device may be described as follows:—The two members are collapsed until the inner end 20 of member 15 bears against the shoulder presented by the inner end of the bushing 18. As the latter is rigid with the barrel member 16, said member 16 can then be used as a handle to turn the tail piece or member 15 home on the tapered thread 13. Then when the barrel member 16 is rotated backward while member 15 is held stationary, the first half of its longitudinal movement is in a straight line (in alinement with pipe section 12) because one end 22 of member 16 is traveling along a cylindrical or straight portion of member 15 while an internal cylindrical portion of member 16 is traveling over the larger end 20 of the tapered portion of member 15, all as will be evident by comparing Figs. 3 and 5. This guided movement continues until the internal thread 24 takes thread 14 of pipe section 12, and so avoids liability of crossing and spoiling threads during the final movement of the barrel member to the position shown in Fig. 5.

As the barrel member 16 and tail piece member 15 are inseparably connected, neither member can become lost or mislaid when out of pipe-joining position. That is, both members must always remain in assembled condition ready for use.

A decided advantage in forming the two coupling members, so that they are under all conditions in screw-threaded engagement, lies in the fact that when screwing onto the latter pipe section, it is not necessary to pick up at the same time the threads by which the coupling members are joined together.

The reason why, with this device, it is not necessary to use particular pains to pick up the threads is because the two members are provided with threaded portions which are always interengaged somewhere along their length, no matter what may be the amount of shortening or collapsing of the whole coupling. The barrel member is internally threaded along its intermediate portion, said intermediate internally threaded portion being always engaged by the threads at the larger end of the tapered portion of the tail piece member. Therefore the members preserve their alinement when collapsed, and also while being extended, as hereinbefore described.

I claim:

1. A pipe coupling comprising a plurality of members collapsible to a length less than the distance between the pipe ends to be joined by said coupling, said members having continuously inter-engaged threaded portions, and each member having its outer end internally threaded for engagement with an externally threaded pipe end.

2. A collapsible coupling comprising a barrel member and a tail piece member inseparably connected and collapsible to a length less than the distance between the pipe ends to be joined by said coupling, the tail piece member having its inner end tapered, and the barrel member having its end which is in engagement with the tail piece member, correspondingly tapered to engage the tapered threaded end of the tail piece member, the intermediate portion of the barrel member being internally threaded to preserve engagement with the threads at the larger end of the tapered portion of the tail piece member.

3. A collapsible pipe coupling the members of which are inseparably connected and capable of collapsing to a length to permit the coupling to be inserted laterally between the ends of two pipe sections, the coupling being then extensible to join said pipe sections without varying the space between them, said members being provided with continuously inter-engaged threaded portions and having internally threaded outer ends.

4. A pipe coupling device comprising an internally threaded barrel member having a cylindrical portion and a tapered portion, and an externally threaded tail piece member having a cylindrical portion and a tapered portion, said members being provided with continuously inter-engaged threaded portions to preserve their alinement when collapsed and while being extended and having internally threaded outer ends.

5. A pipe coupling device comprising an internally threaded barrel member having a cylindrical portion and a tapered portion, and an externally threaded tail piece member having a cylindrical portion and a tapered portion, said members having also tapered internally threaded end portions to engage pipe sections, said members being provided with continuously inter-engaged threaded portions to preserve the alinement of the members at all times.

6. A pipe coupling device comprising an internally threaded barrel member having a cylindrical portion and a tapered portion, and an externally threaded tail piece member having a cylindrical portion and a tapered portion, said members having also tapered internally threaded end portions to engage pipe sections, said members having co-acting abutting faces whereby the barrel member may be utilized as a handle to screw the tail piece member on a pipe section.

7. A pipe coupling, comprising inner and outer members formed with screw threads for two opposed pipe sections, an external screw thread on said inner member, and an internal screw thread formed in two sections of different diameters in said outer member for coöperative engagement with said external thread.

8. A pipe coupling comprising inner and outer members, an external thread on the inner member and an internal thread in the outer member, comprising a relatively large section adapted to coöperate freely with said external thread, and a relatively small section adjoining the larger section and adapted to coöperate tightly with said external thread.

9. A pipe coupling comprising inner and outer members, an internal screw thread in the outer member including a section of relatively larger diameter, and a section of relatively small diameter, and an external tapering thread on the inner member whose major portion is adapted to coöperate freely with said larger section, and to coöperate tightly with said smaller section, and whose minor portion is adapted to enter the smaller section when the major portion is engaged with the larger section.

In testimony whereof I have affixed my signature, in presence of two witnesses.

JOHN N. GOODALL.

Witnesses:
WILLIAM E. MARVIN,
LELLIE WATSON.